(12) United States Patent
Hayner et al.

(10) Patent No.: US 9,680,352 B2
(45) Date of Patent: Jun. 13, 2017

(54) CONVECTION COOLING SYSTEM FOR MOTORS

(71) Applicant: TA INSTRUMENTS-WATERS L.L.C., Milford, MA (US)

(72) Inventors: Mark A. Hayner, Belmont, MA (US); Thomas Andrikowich, Whitinsville, MA (US); Christopher A. Pare, Franklin, MA (US)

(73) Assignee: TA Instruments-Waters L.L.C., Milford, MA (US)

( * ) Notice: Subject to any disclaimer, the term of this patent is extended or adjusted under 35 U.S.C. 154(b) by 714 days.

(21) Appl. No.: 14/041,231

(22) Filed: Sep. 30, 2013

(65) Prior Publication Data
US 2015/0091393 A1 Apr. 2, 2015

(51) Int. Cl.
| H02K 1/20 | (2006.01) |
| H02K 5/18 | (2006.01) |
| H02K 9/04 | (2006.01) |
| H02K 9/22 | (2006.01) |
| H02K 33/16 | (2006.01) |
| H02K 41/03 | (2006.01) |

(52) U.S. Cl.
CPC ............... *H02K 9/04* (2013.01); *H02K 1/20* (2013.01); *H02K 5/18* (2013.01); *H02K 9/22* (2013.01); *H02K 33/16* (2013.01); *H02K 41/031* (2013.01)

(58) Field of Classification Search
CPC .. H02K 1/20; H02K 3/24; H02K 9/22; H02K 41/00–41/065
USPC .................................. 310/12.29, 58, 59, 64
IPC ................................................ H02K 1/20,9/22
See application file for complete search history.

(56) References Cited

U.S. PATENT DOCUMENTS

| 6,958,562 B1 | 10/2005 | Vargo et al. | |
| 2008/0246349 A1* | 10/2008 | Miyamoto | F16C 29/06 310/12.31 |
| 2009/0121564 A1* | 5/2009 | Pal | H02K 1/20 310/58 |

(Continued)

FOREIGN PATENT DOCUMENTS

| WO | 2013063677 A1 | 5/2013 |
| WO | 2013101442 A2 | 7/2013 |

OTHER PUBLICATIONS

International Search Report and Written Opinion in related International Patent Application No. PCT/US14/57962, mailed on Mar. 27, 2015; 12 pages.

(Continued)

*Primary Examiner* — Thomas Truong
(74) *Attorney, Agent, or Firm* — McCarter & English, LLP; Deborah M. Vernon (57) ABSTRACT

An apparatus includes a lamination stack for a motor stator. The lamination stack comprises a plurality of conductive laminates. The laminates are coupled to each other in a stacking direction along a stacking axis. Each laminate comprises a base, a plurality of fins extending from a first side of the base, a plurality of spacings between the fins, a row of teeth extending from a second side of the base opposite the first side, each tooth constructed and arranged to communicate with windings of a conductive coil, and a plurality of spacings between the teeth. The lamination stack also comprises a plurality of first channels formed from the spacings between the fins and a plurality of second channels formed from the spacings between the teeth. The first and second channels extend along the stacking axis.

15 Claims, 8 Drawing Sheets

(56) References Cited

U.S. PATENT DOCUMENTS

| | | | |
|---|---|---|---|
| 2010/0194218 A1 | 8/2010 | Daboussi et al. | |
| 2012/0242176 A1* | 9/2012 | Pal .......................... | H02K 1/20 310/43 |
| 2013/0169079 A1 | 7/2013 | Andrikowich et al. | |
| 2013/0278092 A1* | 10/2013 | Coldwate ................ | H02K 1/20 310/59 |
| 2014/0232210 A1* | 8/2014 | Safaee ................ | H02K 41/025 310/12.29 |

OTHER PUBLICATIONS

Festa, et al., "Design Aspects of Circumferentially Cooled Frameless Machines", International Conference on Electrical Machines and Systems, Nov. 2009, Tokyo, pp. 1-6.
Baggu, M.M. & H.L. Hess, "Evaluation of an Existing Thermal Model of an Induction Motor and its Further Application to an Advanced Cooling Topology", IEEE International Electric Machines & Drives Conference, May 2007, vol. 2, pp. 1079-1083.
Kakahama, et al., "Cooling Airflow in Unidirectional Ventilated Open-Type Motor for Electric Vehicles", IEEE Transactions on Energy Conversion, Sep. 2006, vol. 21, No. 3, pp. 645-651.

* cited by examiner

CONVECTION COOLING SYSTEM FOR MOTORS

RELATED APPLICATIONS

This application is related to U.S. patent application Ser. No. 13/339,786, filed on Dec. 28, 2011, published as U.S. Publication Number US 2013/0169079 on Jul. 4, 2013, entitled "Motor Cooling System," the contents of which are incorporated by reference herein in its entirety.

FIELD OF THE INVENTION

The present invention relates generally to electric motors, and more specifically, to systems and methods for cooling a motor.

BACKGROUND

Electric motors generate a significant amount of heat during operation. Because certain components of a motor, including armature coils and associated magnetic cores and permanent magnets, are sensitive to temperature, cooling systems are typically provided to mitigate the risk of deterioration in motor performance.

BRIEF SUMMARY

In accordance with one aspect, an apparatus includes a lamination stack for a motor stator. The lamination stack comprises a plurality of laminates. The laminates are coupled to each other in a stacking direction along a stacking axis. Each laminate comprises a base, a plurality of fins extending from a first side of the base, a plurality of spacings between the fins, a row of teeth extending from a second side of the base opposite the first side, and a plurality of spacings between the teeth. The lamination stack also comprises a plurality of first channels formed from the spacings between the fins and a plurality of second channels formed from the spacings between the teeth. The first and second channels extend along the stacking axis.

Embodiments may include one or more of the following:

Each laminate includes a single sheet of thermally conductive material.

Each laminate further comprises first and second legs extending from the first side of the base, wherein the fins extend from the first side of the base between the first and second legs.

The spacings between the fins and the spacings of the teeth are constructed and arranged to form fluid flow paths that are parallel each other, and wherein a single source of cooling fluid is received along the parallel fluid flow paths.

Each laminate is formed of a common stock such that the fins are integral with the base.

The first channels between the fins have a first width between adjacent fins for a natural convection configuration or a second width that is less than the first width for a forced convection configuration.

At least one laminate of the lamination stack is offset relative to an adjacent laminate of the lamination stack.

In accordance with another aspect, an electric machine comprises an external housing and a stator assembly positioned in an interior of the external housing. The stator assembly includes a plurality of electrically conductive coils and a lamination stack comprising a plurality of laminates coupled to each other in a stacking direction along a stacking axis. The lamination stack comprises a base, a plurality of fins extending from a first side of the base, and a row of teeth extending from a second side of the base opposite the first side. The teeth are constructed and arranged to communicate with windings of the electrically conductive coils. The lamination stack further comprises a plurality of fin channels between the fins and a plurality of coil spacing channels between the electrically conductive coils about the teeth, wherein the fin channels and the coil spacing channels extend along the stacking axis.

Embodiments may include one or more of the following:

The electric machine further comprises at least one inlet at the external housing that receives a source of cooling air, wherein a direction of flow of the cooling air is the same as the stacking axis.

The electric machine further comprises a fan configured to cause air to flow through at least one of the fin channels and the coil spacing channels.

The electric machine further comprises a first heat removal path from the coils to a first airflow through the coil spacing channels; and a second heat removal path from the coils to a second airflow through the fin channels via the lamination stack.

A combination of the first and second heat removal paths causes cooling of at least one of the electrically conductive coils and a magnetic core in proximity of the electrically conductive coils.

The electric machine is an electromagnetic motor.

The electric machine further comprises an inlet port at a first end of the electric machine and an exhaust port at a second end of the electric machine opposite the first end, the fin channels and the coil spacing channels receiving a source of cooling air from the inlet port and outputting the source of cooling air to the exhaust port.

In accordance with another aspect, a method comprises providing an electric machine. The electric machine comprises an external housing and a stator assembly positioned in an interior of the external housing. The stator assembly includes a plurality of conductive coils; and a lamination stack comprising a plurality of conductive laminates coupled to each other in a stacking direction along a stacking axis. The lamination stack comprises a base; a plurality of fins extending from a first side of the base, and a row of teeth extending from a second side of the base opposite the first side. The teeth are constructed and arranged to communicate with windings of the electrically conductive coils. The lamination stack further comprises a plurality of fin channels between the fins and a plurality of coil spacing channels between the electrically conductive coils about the teeth. The fin channels and the coil spacing channels extend along the stacking axis. The method further comprises causing air to flow about the fin channels and the coil spacing channels in a same direction as the stacking axis.

Embodiments may include one or more of the following:

The method further comprises receiving a source of cooling air at the electric machine and providing at least one inlet at the external housing that receives the source of cooling air, wherein a direction of flow of the cooling air is the same as the stacking axis.

The method further comprises configuring a fan to cause air to flow through at least one of the fin channels and the coil spacing channels.

The method further comprises forming a first heat removal path from the coils to a first airflow through the coil spacing channels and forming a second heat removal path from the coils to a second airflow through the fin channels via the lamination stack.

A combination of the first and second heat removal paths causes cooling of at least one of the electrically conductive coils and a magnetic core in proximity of the electrically conductive coils.

The method further comprises providing an inlet port at a first end of the electric machine and an exhaust port at a second end of the electric machine opposite the first end and receiving at the fin channels and the coil spacing channels a source of cooling air from the inlet port and outputting the source of cooling air to the exhaust port.

BRIEF DESCRIPTION

The above and further advantages of embodiments of the present inventive concepts may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
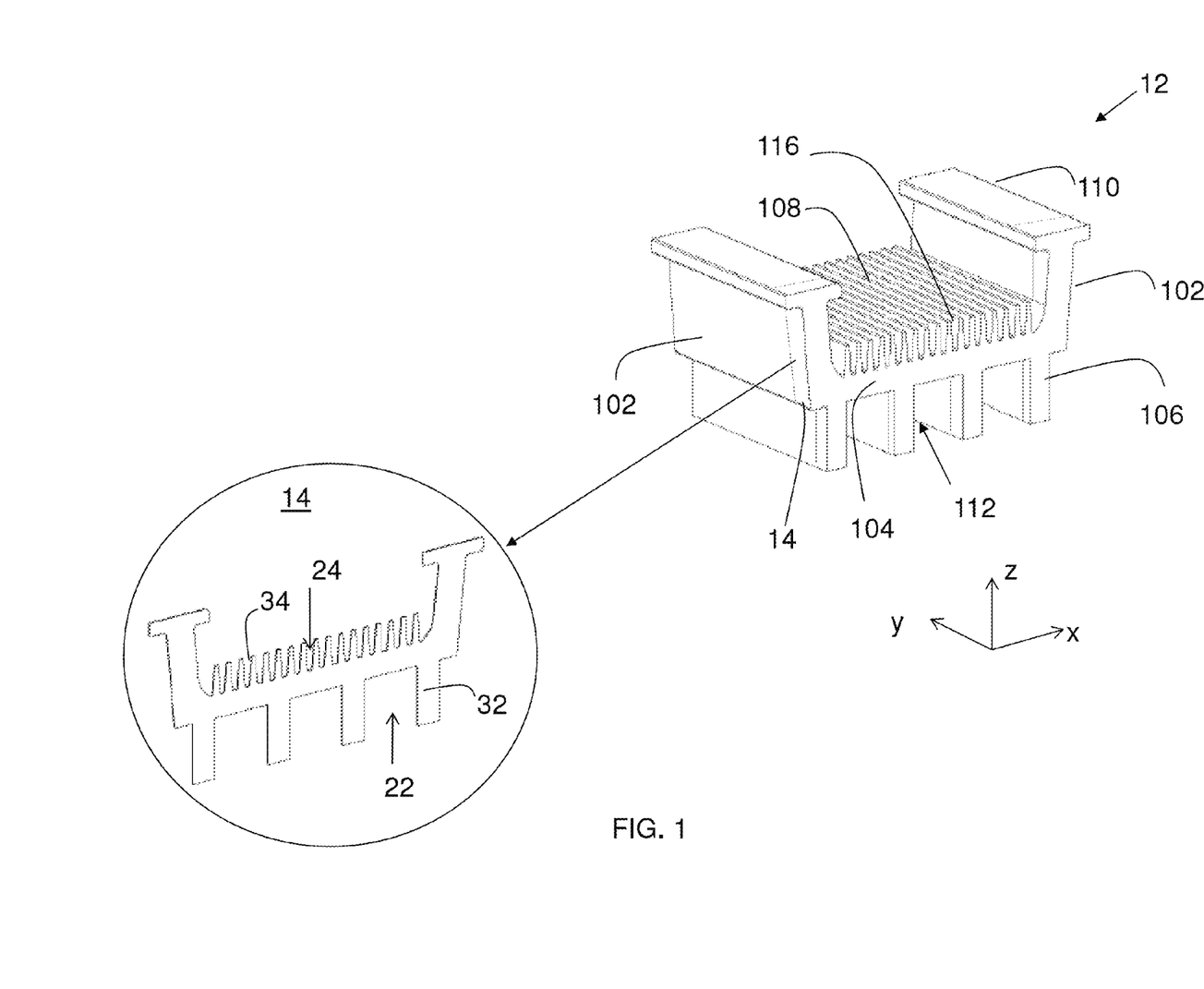
FIG. 1 is a perspective view of a lamination stack, in accordance with an embodiment.

FIG. 1 is a perspective view of a lamination stack 12, in accordance with an embodiment. The lamination stack 12 is constructed and arranged for cooling an electric machine such as a linear motor.

The lamination stack 12 includes a plurality of thin sheets 14, or laminates, each having a same or similar configuration, which are coupled together, for example, by adhesives, external attachments, or other bonding technique known to those of ordinary skill in the art. The sheets 14 are formed of steel or related material having preferable properties with respect to conductivity, magnetic permeability, and thermal conductivity. A plurality of lamination stacks 12 can be positioned relative to an armature or the like, for example, as part of stators sandwiching a movable armature forming an actuator or other motor element. Accordingly, the lamination stacks 12 are constructed and arranged to conduct magnetic flux generated by a current flowing in a set of coils (not shown) positioned about the lamination stacks 12 through a desired magnetic path, so it can interact with the armature to produce a desired force output.

The stack 12 includes two end protrusions or legs 102, a base 104, also referred to as a back-iron portion, a row of teeth 106 extending from, and evenly spaced at, a surface of the back-iron 104, and a plurality of fins 108. These stack elements, i.e., the legs 102, base 104, etc., are preferably formed, for example, machined, punched, or laser cut, from a common stock, to form a sheet 14. Each sheet is coupled to another sheet 14 having a same or similar configuration to form the stack 12.

In particular, each sheet 14 includes a plurality of first elements 32, or teeth, and a plurality of second elements 34, or fins. The first elements 32 are separated from each other by first spacings 22. Each first spacing 22 has a predetermined distance between adjacent first elements 32. The second elements 34 are separated from each other by second spacings 24. Each second spacing 24 has a predetermined distance between adjacent second elements 34.

The sheets 14 are coupled to each other so that the first spacings 22 and the second spacings 24 of the sheets 14 are aligned, nearly aligned, or otherwise positioned relative to each other. Accordingly, a plurality of fin channels 116 can be formed from the second spacings 24 between the teeth. The fin channels 116 can extend along a same axis as the stacking direction of the sheets 14, for example, along the y-direction of the Cartesian coordinate system shown in FIG. 1.

Similarly, the first spacings 22 in the stacked sheets 14 can be aligned or otherwise positioned relative to each other in other stacked sheets 14 to form a plurality of channels 112 from the first spacings 22. The tooth channels 112 can extend along a same axis as the stacking direction of the sheets 14 and the fin channels 116, for example, along the y axis shown in FIG. 1.

In some embodiments, one or more stacks can have varying lamination geometries. For example, a lamination stack can be constructed and arranged so that the teeth are identical, but that the fins have different positions with respect to each other.

The legs 102 are constructed and arranged to be mechanically attached to a motor frame or the like, and for providing flow paths, or air flow passages, between the end protrusions 102 and/or about the fins 108.

Figure 2A:
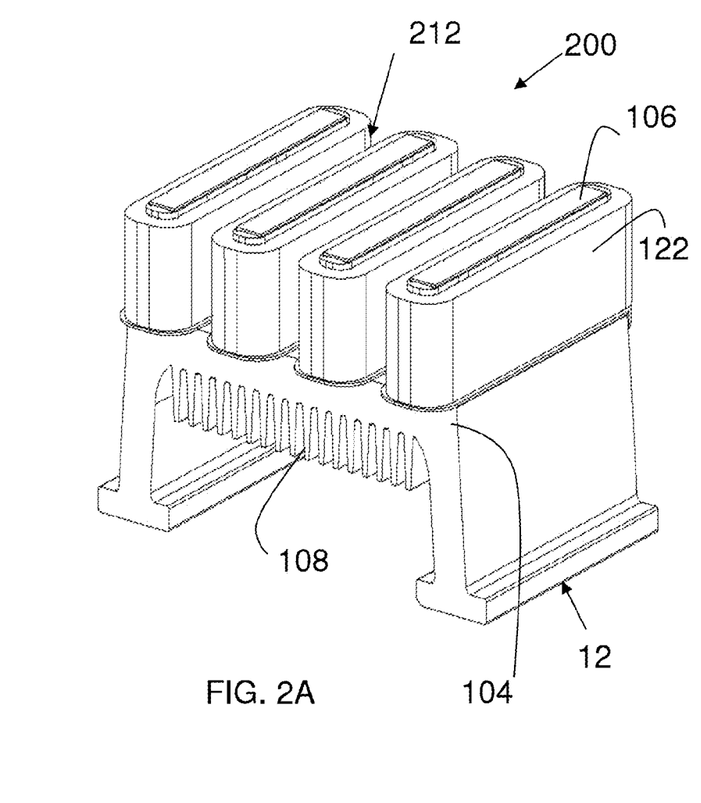
FIG. 2A is a perspective view of a stator assembly, in accordance with an embodiment.
Figure 2B:
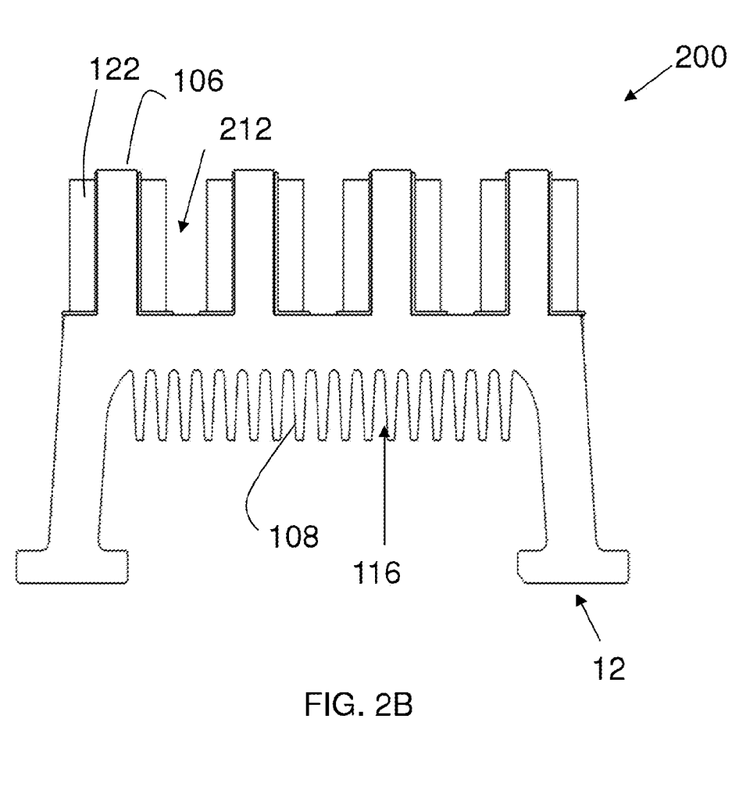
FIG. 2B is a cross-sectional front view of the stator assembly of FIG. 2A.

The shape of the teeth 106 can be rectangular, square, tapered, triangular, trapezoidal, or be of other shape having multiple sides for communicating with the windings of an electrically conductive coil 122, which are positioned about the tooth 106, for example, shown at FIGS. 2A and 2B.

The teeth 106 are separated from each other by a predetermined distance 22 sufficient for proper spacing between coils 122. Stack slots 112 between the teeth 106 are constructed and arranged to have a width or other dimensions sufficient to permit coils about the teeth 106 to be tightly packed, for example, shown in FIGS. 2A and 2B, while allowing spacings 212, also referred to as coil spacing channels, to be formed after positioning of the coils 122 about the teeth 106, so that air flow can occur in the spacings 212 between adjacent coils 122, and exposing a surface area of the coils 122 to the circulating air. The conductive coils 122 are arranged about an armature, a rotor, or the like to produce a force or other result well-known to those of ordinary skill in the art, and for permitting current to flow through the conductive coils 122, which may generate undesirable heat requiring the need for a cooling air flow. The spacings 212 can be provided for permitting a heat transfer away from the coils 122 due to the cooling air flow through the spacings 212. Also, the spacings 212 can be determined to accommodate a tradeoff between the open areas provided by the spacings 212 for air flow and the size of the stack 12, which must be increased to accommodate an increased size of the spacings 212.

As described above, the fins 108 extend from an opposite side of the base 104 as the teeth 106. The fins 108 are constructed and arranged to increase the surface area over which heat is able to dissipate from the stack 12 to the surrounding air, thereby aiding in the cooling of the device, e.g., the motor, and also providing desirable effects such as reducing thermal resistance from the stack 12 to the ambient environment. The shape of the fins 108 can be rectangular, square, tapered, triangular, trapezoidal, or be of other shape having multiple sides. The spacings 212 between the coils 122 and spacings between the fins 108 can be, but are not required to be, aligned such that a single source of cooling fluid flow is used to flow fluid over both structures. The paths over the coils and fins are in parallel flow paths therefore simplifies the structure of the stack 12.

The fin geometry can be optimized for either free or natural or forced convection air cooling. For example, the fin channels 116 between adjacent fins 108 can be wider for natural convection configurations, and can be narrower for forced convection configurations, for example, configuration including a fan, blower, pump, or other apparatus that provides a supply of a cooling fluid to the stack 12 such as a gas at a predetermined velocity. Other fin geometries, such as changes in thickness, length, fin-fin spacing, and so on, can apply. For example, in embodiments where a spacing width between adjacent teeth 106 in a forced convection air cooling configuration is about 27 mm, fin-fin spacing width can be but is not limited to 6-9 mm. In a natural air cooling convection configuration, the fin-fin spacing width can be greater than a spacing width of a forced air cooling convection configuration.

FIG. 2A is a perspective view of a stator assembly 200, in accordance with an embodiment. FIG. 2B is a cross-sectional front view of the stator assembly 200 of FIG. 2A.

The stator assembly 200 includes a lamination stack 12 and a plurality of coils 122 wrapped about the teeth 106 extending from the base 104 of the lamination stack.

As described above, the coils 122 can be tightly packed about a plurality of teeth 106 extending from the base 104. The spacings 212 are between adjacent coils 122 positioned about the teeth 106 extending from the back-iron 104. The spacings 212 between adjacent coils 122 allow a large fraction of the surface area of the coils 122 to be exposed to circulating air to facilitate heat transfer from the coils 122 to the air flowing in the spacings 212.

A feature of the stator assembly 200 is that multiple heat removal paths can be formed, each carrying heat away in different directions relative to each other. For example, one heat removal path comprises a conduction path through the lamination stack 12 to the fins 108, where heat is convectively transferred from the fins to the surrounding environment in channels 116 (either via natural or forced convection). A second heat transfer path comprises transfers heat generated in coils 122 directly to the surrounding environment in spacings 212 between coils 122 (either via natural or forced convection). Multiple heat transfer paths are formed to allow heat, for example, formed at hotspots at the coils 122, to be removed in a manner that reduces undesirable temperature rise as compared to conventional convection cooling approaches.

Figure 3A:
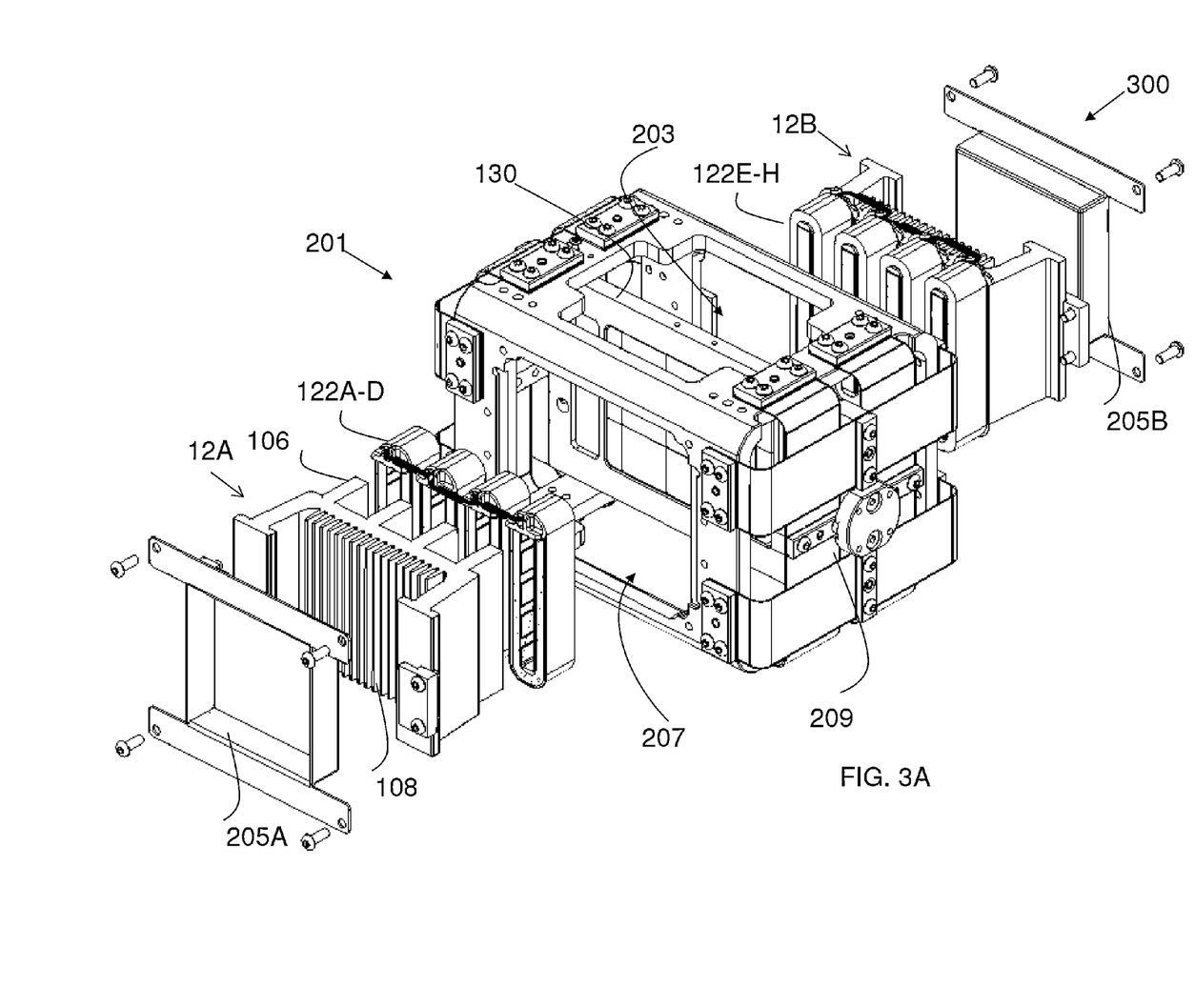
FIG. 3A is an exploded view of a motor, in accordance with an embodiment.
Figure 3B:
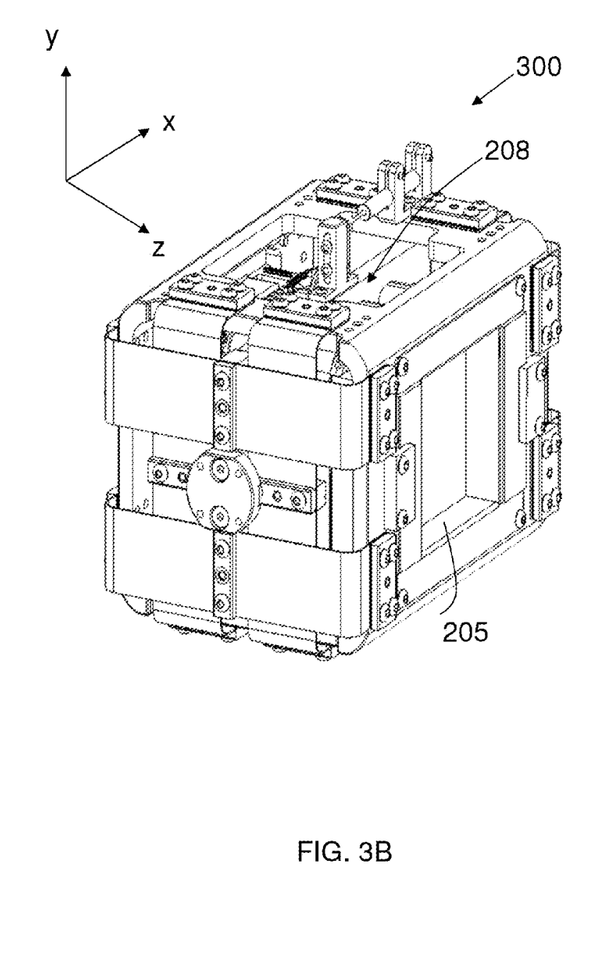
FIG. 3B is an assembled view of the motor of FIG. 3A.
Figure 3C:
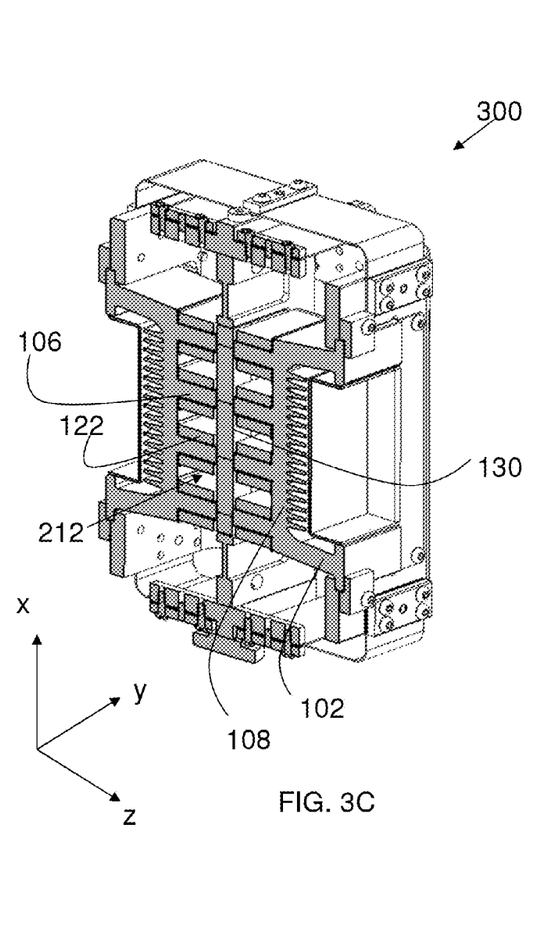
FIG. 3C is a perspective view of the motor of FIGS. 3A and 3B, with the bottom half of the motor cut away to reveal other elements of the motor.
Figure 3D:
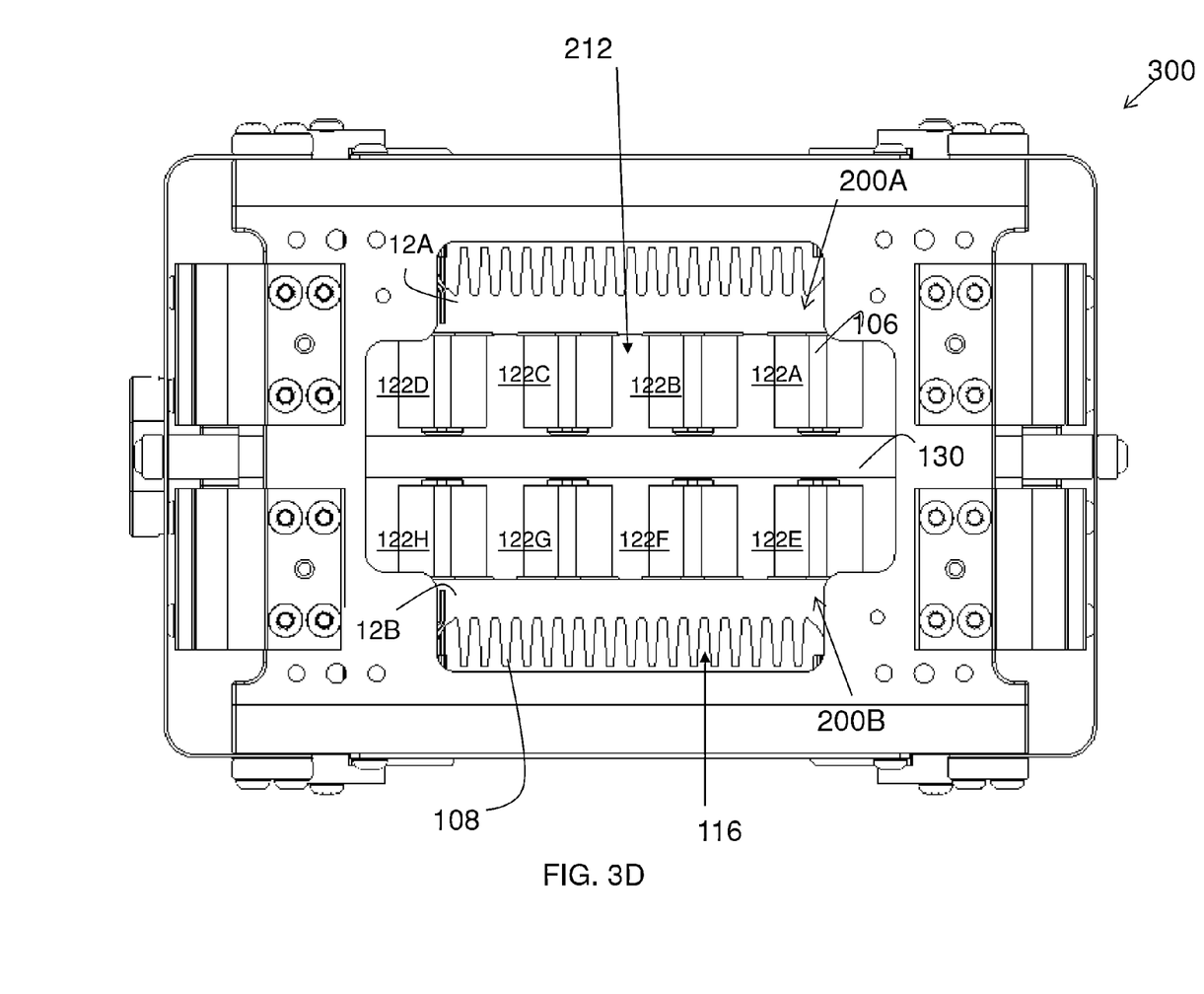
FIG. 3D is an end view of the motor of FIGS. 3A-3C, illustrating a stator assembly therein, in accordance with an embodiment.

FIG. 3A is an exploded view of a motor 300, in accordance with an embodiment. FIG. 3B is an assembled view of the motor 300 of FIG. 3A. FIG. 3C is a perspective view of a cross-section of the motor 300 of FIGS. 3A and 3B, with the bottom half of the motor 300 cut away to reveal other elements of the motor 300. FIG. 3D is an end view of the motor 300 of FIGS. 3A-3C and a stator assembly 200 therein, in accordance with an embodiment.

In an embodiment, the motor 300 is a linear motor or related electric machine that applies a linear force along at least a portion of its length. In other embodiments, the present inventive concepts can be applied to other types of electric machines known to those of ordinary skill in the art, for example, rotary motors, permanent magnet motors, induction motors, single phase motors, multi-phase motors, DC motors, and so on.

The motor 300 is formed of an external housing 201 which houses an internal body 203. The internal body 203 includes one or more stators, for example, including a plurality of coils 122A-122H (generally, 122), each positioned about a stack tooth 106 of a lamination stack 12A, 12B, respectively. The internal body 203 can include an armature frame 130 in proximity to the magnetic cores or teeth 106 about which a set of armature coils 122 or the like are positioned. A set of flexures 209 can be attached to the armature frame 130 for permitting low friction motion in the x-direction according to Cartesian coordinates shown in FIGS. 3A-C, at least in part by centering the armature 130 between the stacks 12A, 12B. The armature 130 is constructed and arranged to include at least one north pole and at least one south pole, and oriented related to the coils 122 for generating a motor output force in response to current flowing in the coils 122, in a manner well-known to those of ordinary skill in the art. The motor 300 can generate a significant amount of heat, for example, from current flowing through the coils 122, or eddy currents or hysteresis effect with respect to the stack or magnets. The performance of the motor components decreases with increasing motor temperature.

A convection cooling system is employed in accordance with the present inventive concepts to dissipate the heat generated by the motor 300. In particular, one or more inlets 208 is positioned at a face of the external housing 201 that extends along a same direction of extension, i.e., y-direction, as the fins 108 of the stacks 12A, 12B, respectively. A fan bank, blower, pump, or the like (not shown) can be positioned in a region near the inlet 208 to blow a cooling fluid such as air, into the interior of the motor 300. The exhaust air or the like exits the motor 300 via one or more outlets 216, such as an exhaust port on a face of the motor 300 opposite the face having the one or more inlets 208, shown for example at FIGS. 4A-4C.

The motor 300 can include covers 205A, 205B (generally, 205) mechanically coupled to the stacks 12A, 12B, respectively. Each cover 205 can be constructed and arranged for insertion between the protrusions 102 extending from the stacks 12A, 12B, for ensuring air flow through the spacings between the fins 108. Each stack 12A, 12B can be inserted in an opening 207 in the housing 203 with the coils 122 and the armature frame 130, and covered with a cover 205.

Figure 4A:
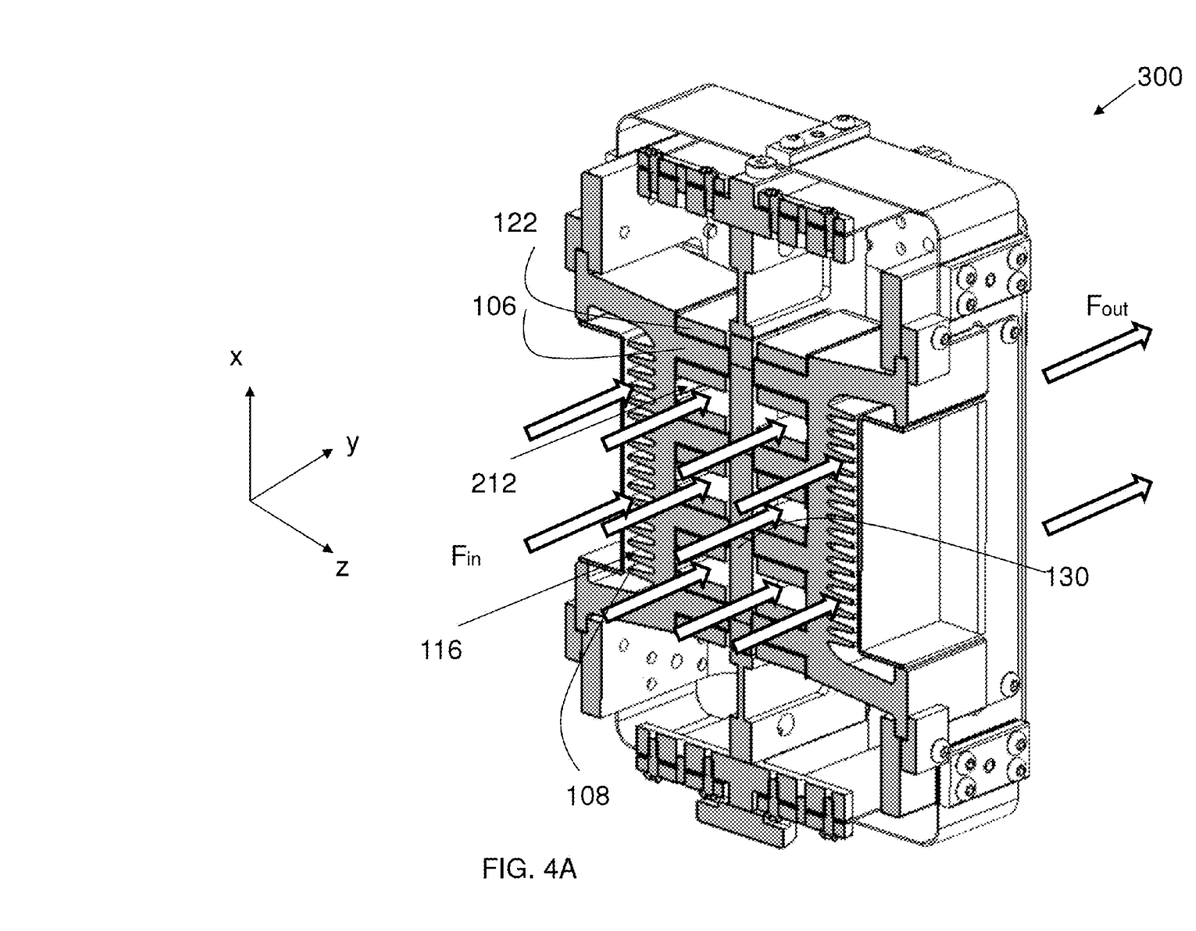
FIG. 4A is a perspective view of a cross-section of the motor of FIGS. 3A-3D, including an illustration of air flows at the motor, in accordance with an embodiment.
Figure 4B:
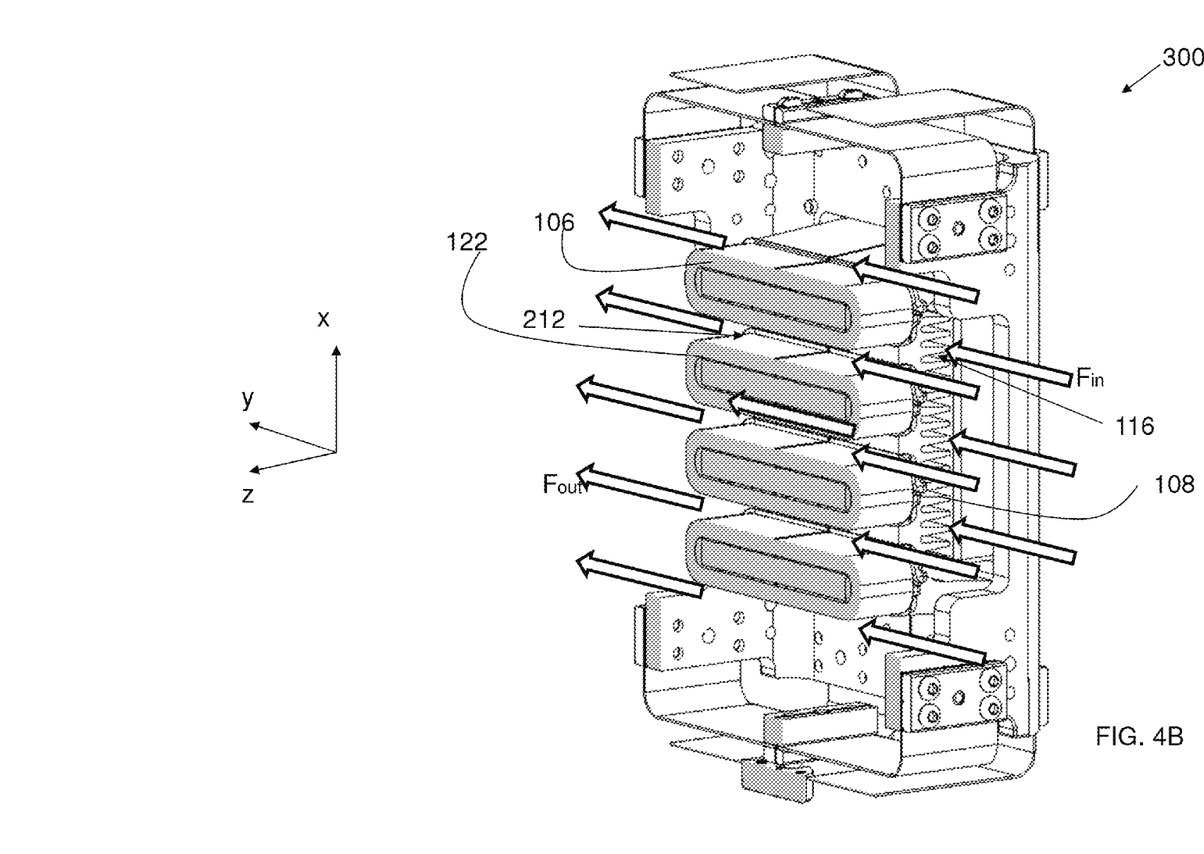
FIG. 4B is a perspective view of an interior of the motor of FIGS. 3A-3D and 4A, including an illustration of air flows at the motor, in accordance with an embodiment.
Figure 4C:
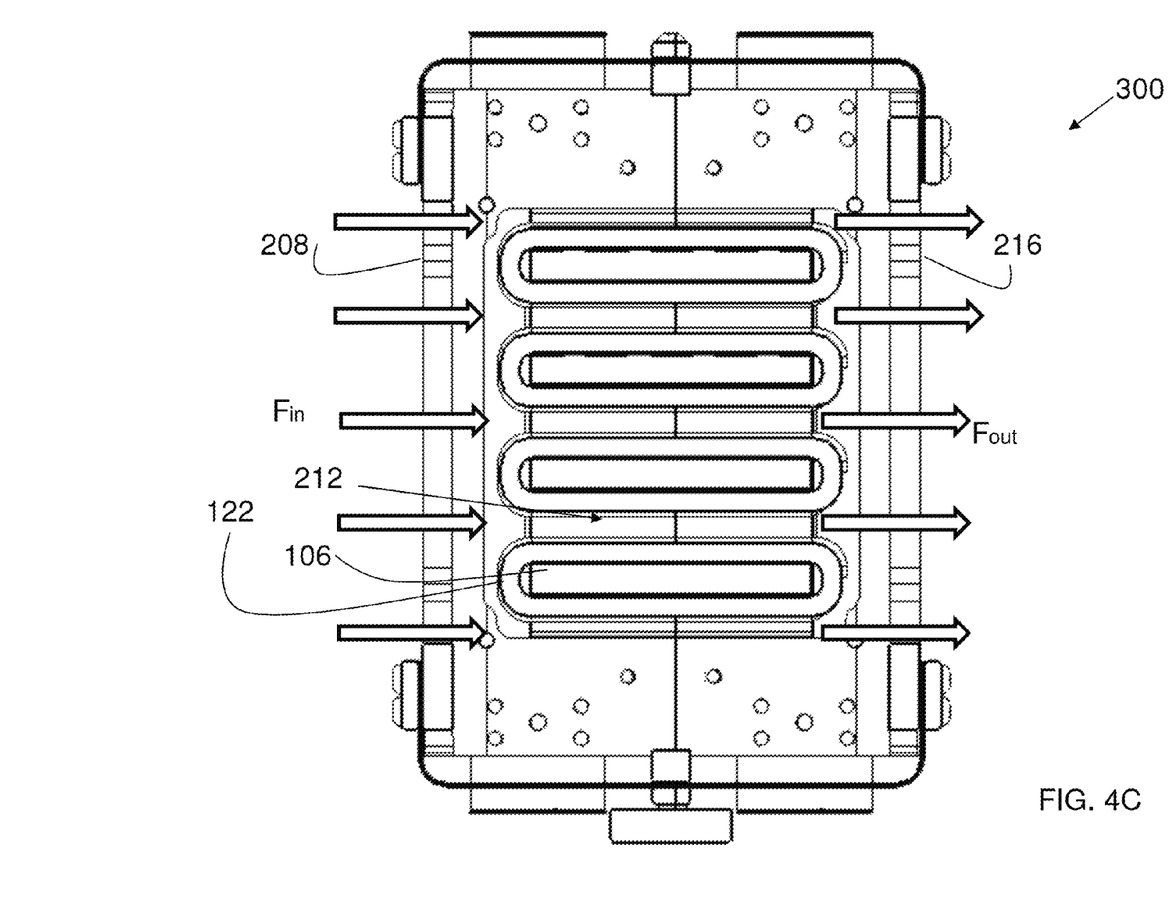
FIG. 4C is a cutaway top view of the motor of FIGS. 3A-3D, 4A, and 4B and a stator assembly therein, including an illustration of air flows at the motor, in accordance with an embodiment.

FIG. 4A is a perspective view of the motor 300 of FIGS. 3A-3D, taken along line 3C-3C, including an illustration of air flows through the motor 300, in accordance with an embodiment. FIG. 4B is a perspective view of an interior of the motor 300 of FIGS. 3A-3D and 4A, including an illustration of air flows through the motor 300, in accordance with an embodiment. FIG. 4C is a cutaway top view of the motor 300 of FIGS. 3A-3D, 4A, and 4B and a stator assembly therein, including an illustration of air flows through the motor 300, in accordance with an embodiment.

A cooling air flow $F_{in}$ is provided to the motor 300 via one or more inlets 208, passes through the interior of the motor 300 and through parallel channels or spacings 116, 212, and exits the motor 300 as an exhaust air flow $F_{out}$ via one or more outlets 216 at an opposite side of the motor 300 than the side of the motor 300 having the inlets 208.

In an embodiment, the cooling air flow $F_{in}$ is in the same or similar direction, for example, along the y-axis, as the direction of the channels formed by the fins 108, which in turn extend along a same direction of the planes, for example, the x-y plane, of the stacked laminates. A first heat removal path can be formed from the coils 122 to the air flow $F_{in}$ through the coil spacing channels 212. A second heat removal path can be formed from the coils 122 to the air flow $F_{in}$ through the fin channels 116 via the lamination stack 12. Accordingly the air flow direction serves to cool the coils 122 and associated elements such as magnetic cores or related motor elements. In some embodiments, the first and second heat removal paths are parallel. In other embodiments that do not include the first heat removal path, for example, due to the absence of channels between the teeth, at least the second heat removal path is present.

The path of the air flow $F_{in}$ is preferably unobstructed from the inlet 208 to the outlet 216, permitting air, or other cooling fluid, through the motor 300 at a high velocity, which provides a high heat transfer coefficient between the air and the motor components.

In the interior of the motor 400, open space can be provided to facilitate air flow across the coils 122 or other heat-generating elements, such as magnetic cores. The spacings 212 between adjacent coils 122 and the spacings 116 between adjacent fins 108 allow a large fraction of the surface area of the coils 122 and stacks 12 to be exposed to the circulating air flow $F_{in}$, facilitating heat transfer to the air. The addition of fins 108 increases the surface area of the stack 12 exposed to the flow of cooling fluid, which improves heat transfer from the stack 12 to the cooling fluid.

High velocity air flow enhances the heat transfer coefficient between the coils 122 and the circulating air flow $F_{in}$, permitting heat to be effectively removed from the airstream, shown by exhaust air flow $F_{out}$. The volume of space available for air flow, i.e., the size and geometry of the spacings 212 between the coils 122 and/or the spacings 116 between fins 108, can affect the system impedance with respect to air flow, and thus influence the velocity of air passing through the motor 400.

Accordingly, a motor lamination stack having cooling fins integrated at a stator lamination stack in accordance with embodiments of the present inventive concepts permit motor efficiency to be improved due to lowering of coil and magnet temperatures.

Another feature is that the number of parts required are reduced, since a separate heat sink is not required, thereby providing for a simplified system design, in particular, a closed flow design, for example, a configuration where air is output from the motor to an ambient environment or where circulates in a system having a circuit with a heat exchanger, which can improve a permissible air flow about a stator during operation. Also, the integral lamination geometry in accordance with embodiments can result in a reduced cost as compared to the cost of attaching a stack where thermal grease or the like is applied between the stack and a set of cooling fins. In addition, no interface thermal resistance extends between the back of the lamination stack and cooling fins due to the integral design. The integral design also permits heat to be removed from the stator through the heat sink fins even where circulating air flow does not occur in spacings 212, for example, by forced convection. For example, referring again to FIG. 2B, in embodiments, where no such spacings 212 exist between adjacent coils 122, which would otherwise impede or prevent air flow, a conduction path nevertheless is available through the lamination stack 12 to the fins 108.

A number of implementations have been described. Nevertheless, it will be understood that the foregoing description is intended to illustrate and not to limit the scope of the inventive concepts which is defined by the scope of the claims. Other embodiments are within the scope of the following claims.

What is claimed is:

1. A lamination stack for a motor stator, comprising:
    a plurality of laminates, wherein the laminates are coupled to each other in a stacking direction along a stacking axis, each laminate consisting of thermally conductive material and comprising:
        a base including a first side and an opposing second side;
        a plurality of fins extending from the first side of the base and a plurality of spacings between the fins;
        a row of teeth extending from the second side of the base and a plurality of spacings between the teeth; and
        first and second end protrusions extending from the first side of the base and on opposing sides of the plurality of fins, the first and second end protrusions configured for attachment to a motor frame, and the first and second end protrusions each defining a height dimensioned greater than a height of the plurality of fins;
    a plurality of first channels formed from the spacings between the fins; and
    a plurality of second channels formed from the spacings between the teeth,
    wherein the first and second channels extend along the stacking axis.

2. The lamination stack of claim 1, wherein each laminate includes a single sheet of thermally conductive material.

3. The lamination stack of claim 1, wherein the spacings between the fins and the spacings of the teeth are constructed and arranged to form fluid flow paths that are parallel to each other, and wherein a single source of cooling fluid is received along the parallel fluid flow paths.

4. The lamination stack of claim 1, wherein each laminate is formed of a common stock such that the fins are integral with the base.

5. The lamination stack of claim 1, wherein the first channels between the fins have a width between adjacent fins for a natural convection configuration.

6. The lamination stack of claim 1, wherein at least one laminate of the lamination stack is offset relative to an adjacent laminate of the lamination stack.

7. The lamination stack of claim 1, wherein the first channels between the fins have a width between adjacent fins for a forced convection configuration.

8. The lamination stack of claim 1, wherein at least one laminate is formed of steel.

9. The lamination stack of claim 1, wherein the plurality of laminates are coupled to each other so that the spacings between the fins are aligned relative to each other and extend along a same axis as the stacking direction.

10. The lamination stack of claim 1, wherein the plurality of laminates are coupled to each other so that the spacings between the teeth are aligned relative to each other and extend along a same axis as the stacking direction.

11. The lamination stack of claim 1, wherein the plurality of laminates are coupled to each other so that the spacings between the fins and the spacings between the teeth are aligned relative to each other and extend along a same axis as the stacking direction.

12. The lamination stack of claim 1, wherein the plurality of laminates are coupled to each other so that the spacings between the teeth are aligned relative to each other and extend along a same axis as the stacking direction and the spacing between the fins have different positions with respect to each other.

13. The lamination stack of claim 1, wherein the shape of the teeth have multiple sides.

14. The lamination stack of claim 1, further comprising a plurality of electrically conductive coils positioned about the teeth.

15. The lamination stack of claim 1, wherein the first and second end protrusions each define a T-shaped configuration.

* * * * *